United States Patent [19]

Clare et al.

[11] Patent Number: 4,859,208

[45] Date of Patent: Aug. 22, 1989

[54] CALCIUM CONTROL SYSTEM: HYDROCOLLOID AND ALGINATE FOR DYE PRINTING

[75] Inventors: Kenneth Clare, San Diego, Calif.; William Gibson, Horsham, England

[73] Assignee: Kelco International Limited, London, England

[21] Appl. No.: 205,415

[22] Filed: Jun. 10, 1988

Related U.S. Application Data

[63] Continuation of Ser. No. 42,067, Apr. 24, 1987, abandoned, which is a continuation of Ser. No. 770,114, Aug. 27, 1985, Pat. No. 4,693,728.

[30] Foreign Application Priority Data

Aug. 30, 1984 [GB] United Kingdom ............... 8421957

[51] Int. Cl.⁴ .................. A23L 1/04; C08L 5/04; D06P 1/48; C09D 11/14
[52] U.S. Cl. ............................ 8/557; 8/448; 8/559; 8/561; 8/562; 426/573; 536/3; 536/11; 536/123
[58] Field of Search ............... 8/557, 561, 562, 559

[56] References Cited

U.S. PATENT DOCUMENTS

| | | | |
|---|---|---|---|
| 3,060,032 | 10/1962 | Glicksman | 426/475 |
| 3,282,717 | 11/1966 | Kelley | 106/208 |
| 3,349,079 | 10/1967 | Freedman | 536/3 |
| 3,764,707 | 10/1973 | Habersberger | 314/779 |
| 4,073,653 | 2/1978 | Lindroth et al. | 106/26 |
| 4,222,740 | 9/1980 | Bohrn et al. | 8/448 |
| 4,436,759 | 3/1984 | Trilling et al. | 426/573 |
| 4,693,728 | 9/1987 | Clare et al. | 8/561 |

FOREIGN PATENT DOCUMENTS

| | | |
|---|---|---|
| 50-090787 | 7/1975 | Japan . |
| 752336 | 7/1956 | United Kingdom . |
| 2058539 | 4/1981 | United Kingdom . |
| 2123856 | 2/1984 | United Kingdom . |

OTHER PUBLICATIONS

Senakhov, A. V. et al., Chemical Abstracts, 1976, 84, (No. 14), p. 68-Abstract 91462a.

*Primary Examiner*—A. Lionel Clingman
*Attorney, Agent, or Firm*—Gabriel Lopez; Hesna J. Pfeiffer

[57] ABSTRACT

Hydrocolloid/salt blends are prepared which controllably release ions into solution. The blends are especially useful in alginate print paste compositions.

7 Claims, No Drawings

CALCIUM CONTROL SYSTEM: HYDROCOLLOID AND ALGINATE FOR DYE PRINTING

This is a continuation of application Ser. No. 042,067, filed 4/24/87, now abandoned which is a continuation of Ser. No. 770,114, filed 8/27/85, now U.S. Pat. No. 4,693,728.

It is well known that the introduction of di-valent ions into soluble alginate solutions rapidly causes gelation through the formation of mixed alginate salts. Where it is desirable to control the speed of this gelation, various methods have been proposed to delay the rate of release of the di-valent ions. An example of this has been the use of a sparingly soluble salt, e.g., calcium citrate, in combination with the soluble alginate, e.g., sodium alginate. The calcium ions are released over time and thus complete gelation is not instantaneous.

It has now been found that if the gelling salt is first mixed with certain hydrocolloids prior to incorporation into the soluble alginate solution, there is a more uniform release of di-valent cation. This minimizes localized gelling and thus allows lower concentrations of alginate to be used to generate a given viscosity. This controlled release of ion also minimizes the amount of insolubles due to incomplete hydration, i.e., a smoother gel is produced. Further, more rapid and complete dissolution is observed when hard water is used in the make-up of the soluble alginate solution.

In the compositions of this invention, the preferred hydrocolloid is guar. Guar is a commercially available gum derived from the seed of the guar plant, *Cyanaposis tetragonolobus*. In addition to guar gum, other hydrocolloids usable in this invention include guar derivatives such as oxidized guar, carboxymethyl guar, de-polymerized guar, and hydroxyalkyl guar such as hydroxyethyl- and hydroxypropyl-guar, polyvinylalcohol, carboxymethyl cellulose (CMC), xanthan gum, cold water soluble locust bean gum, cold water soluble starch, and starch derivatives such as hydroxyethylated and hydroxypropylated starch.

The alginates to be used are the soluble salts of alginic acid. Alginic acid, derived primarily from kelp, is a commercially available product, as are the alginates. Especially preferred alginates are the sodium, potassium, and ammonium salts.

The di-valent salts which can be used in this invention are preferably those of calcium, barium, and strontium. The salts include a range of different solubilities from the least soluble like calcium citrate, tartrate, sulphate, and phosphate to the very soluble like calcium chloride. Thus, the salts include the acetate, bromide, carbonate, fluoride, fumarate, d-gluconate, glycerophosphate, hydroxide, iodide, lactate, di-malate, d-malate, maleate, malonate, nitrate, nitrite, oleate, primary-, secondary-, and tertiary-orthophosphate, proprionate, salicylate, and d-tartrate salts. However, the exact amount and type of each salt and hydrocolloid would depend on the level of ion control required by each application. The tri-valent salts, such as those of aluminium, may also be used.

The blends of the hydrocolloids and di-valent salts are prepared by dry mixing the two ingredients and then slowly adding water under agitation to form a paste or dough. If insufficient water is used (as evidenced by a lack of pasting), the hydrocolloid is not properly hydrated and an unacceptable product is produced. If an excess of water is used (such that the hydrocolloid is mostly dissolved) an acceptable product can be produced but the drying step becomes time-consuming and expensive. The ratio of di-valent salt to hydrocolloid ranges from 10:1 to 1:20 (based on total dry weights). Preferably the range is 5:1 to 1:5. Mixing of the dry ingredients and pasting are easily accomplished, e.g., in a Z-blade or paddle-type dough mixer, although other apparatuses are suitable. To assure proper mixing, the dry ingredients are mixed for about 5 minutes, the water is added for 5–10 minutes, and the paste is mixed for an additional 30 minutes. Following pasting, the dough is crumbled and dried to about 90% solids, e.g., 60°–70° C. in a tray drier. The dried product is milled and classified through 850 micron on 106 micron sieves. These blends therefore are not mere mixtures of hydrocolloid and salt. Rather, the salts are intimately blended with the hydrocolloid. Advantageously, this allows for the controlled release of the salt into solution as described above. Further dry mixtures of these blends with alginates are non-segregating, i.e., the distribution of divalent salt in the dry mixtures remains essentially unchanged over time. This assures the end user that there will be a homogeneous distribution of di-valent cations available for gelation when the gelled aqueous solutions are prepared. These hydrocolloid/di-valent salt blends are usable wherever it is desirable to controllably gel aqueous alginate solutions. Examples of such applications include gelled foods such as pet foods, sauces, gravies, bakery fillings, and structured foods such as structured pimento strips for olives. As stated above, there is a range of usable hydrocolloid:salt ratios. Likewise, there is a variety of specific salts, with varying solubility rates. The combination of these will determine the rate of viscosity build-up, which is dependent on the needs of the individual practitioner.

This blend is especially useful in alginate dye printing systems. The combination of algins and calcium salts has been disclosed in U.S. Pat. No. 4,222,740 as a means of forming dye resist areas on textiles. As taught therein, gelled regions are formed by separately applying a gelable (alginate) composition and a gelling (calcium) agent composition to a textile and then over-dyeing the material, the gelled regions serving as dye resist areas. U.K. 8300635 (DE 3300705 A1) teaches that when very low levels of a gelling agent are used to pretreat a substrate followed by printing with an alginate-containing print paste, the dye usage for equal color yield is reduced, accompanied by improved print definition.

The use of a mixed divalent/monovalent (such as calcium/sodium) salt of alginic acid in the print paste effects a reduction in dye usage for equivalent color yield when compared to a print paste using sodium alginate or other conventional thickener. The reduction in dye usage is accomplished without the necessity of pretreating the substrate. Thus, the use of the mixed calcium/sodium alginate advantageously eliminates one of the process steps required by U.S. Pat. No. 4,222,740 and U.K. 8300635 while producing a savings in dye usage.

In a mixed alginate print paste as described above, the calcium (i.e., divalent ion) can conveniently be provided by the hydrocolloid/salt blends of this invention. This invention, therefore, comprises a mixture of blend of hydrocolloid and salt as hereinbefore described and a soluble alginate, said mixture being especially useful in print paste compositions.

The specific amount and type of alginate used in any particular application will, of course, be dependent on the other materials in the print paste, e.g., oxidizing agents, buffers, etc. These can be determined by the individual practitioner depending on his particular formulation. However, usage levels of the mixture of blend and alginate in the range 10 to 90% by weight are recommended; preferably 40 to 60%. The viscosity of the print pastes should be 5,000 to 30,000 cP (RVT or RVF, Brookfield Viscometer at 20 rpm, spindle 6, 20° C.) immediately before printing, preferably between 12,000–18,000 cP. Optionally, thickening agents such as guar, carboxymethyl guar, de-polymerized guar, locust bean gum, CMC, suitable synthetic polymers, cellulose derivatives such as sodium-carboxymethyl cellulose, and starch derivatives such as starch ether or combinations of said agents may be included to provide some of the viscosity and flow characteristics.

The di-valent ion level is defined as the amount theoretically necessary to convert 16–60% of the soluble alginate, preferably 25–50%, to the desired mixed alginate salt.

The print pastes of this invention are those prepared using pigments or dyes such as disperse dyes, reactive dyes, combinations of disperse and reactive dyes, and acid dyes, i.e., all anionic or non-ionic dyes but not cationic dyes. Reactive dyes are difficult to use because fixation, as with 1.5% sodium carbonate, is deleterious to the $Ca^{++}/Na^{+}$ ratio in the alginate. For brevity's sake, as used herein, the term "dye" is intended to also include "pigment". The invention is most effective with disperse dyes. In addition to the alginate and dye, these print pastes comprise a variety of well known compounds such as buffers, oxidizing agents, etc. The preparation of such pastes is known in the art.

The substrates to be treated include, for example, polyesters, cellulosics, cottons, blends of these such as polyester/cottons, nylons, and polyamides. The substrates can be any material which can be printed with the appropriate dyes.

In the process of this invention the print paste composition can be applied by any conventional printing or dye method such as flat or rotary screen printing, block or raised relief printing, jet printing, stencil printing, engraved cylinder printing, Tak dying, Kuster dying, dip squeeze application, or hand application.

When a substrate is treated according to this invention, the print paste pick-up can be 25% less when compared to pastes using conventional thickeners. The dye actually consumed can be reduced by up to 15–25% typically but taking into account shade strength and different dye colors, the range of dye reductions falls within 5–40%.

Following application of the print paste the substrate is treated as necessary to fix any dyes, then washed, dried and otherwise treated by conventional methods to produce the desired end product.

The invention is further defined by reference to the following examples, which are intended to be illustrative and not limiting.

EXAMPLE 1

Hydrocolloid/Salt Blend (One-Step Process)

| | Wt. (kg) |
| --- | --- |
| Hydroxyethyl-guar gum (disperse dye printing grade) | 250 |
| Tricalcium citrate.4H$_2$O (87% through 250 micron sieve; 45% through 40 micron) | 90 |
| Tap water | 308 |

250 Kg guar and 90 kg calcium citrate were mixed in a paddle-type dough mixer for five minutes. 308 Kg water were added over 5–10 minutes and mixing continued for a further 30 minutes. The dough was discharged, disintegrated, and dried to approximately 90% dry matter, at 60°–70° C. in a tray drier. The product was milled and classified through 850 micron on 106 micron.

EXAMPLE 2

Hydrocolloid/Salt Blend (Two-Step Process)

| | Wt. (kg) |
| --- | --- |
| Hydroxyethyl guar (disperse dye printing grade) | 250 |
| Tricalcium citrate.4H$_2$O (87% through 250 micron sieve; 45% through 40 micron) | 67.3 |
| Tap water | 154 |

125 Kg guar and 67.3 kg of calcium citrate were mixed in a paddle-type dough mixer for five minutes. 154 Kg water were added over 5–10 minutes and mixing continued for a further 30 minutes. The mixer was stopped and a further 125 kg guar added. Mixing resumed for 3–4 minutes. Then the dough was crumbled, dried, milled, and classified as in Example 1.

In the following examples, evaluation of the results was done by visual and instrumental observation of the completely processed substrate. Percentages are by weight unless otherwise stated.

Where fixation and washing is indicated in the examples, the following procedures were used:

The dye was fixed on the printed material by high temperature (H.T.) steam at 175° C. followed by a wash procedure consisting of:

(i) Washing in running tap water;
(ii) Reduction—clear by treating fabic 10–20 minutes at 50° C. in a solution containing 0.2% detergent +0.2% sodium hydroxide +0.2% sodium hydrosulphite;
(iii) Rinsing in tap water;
(iv) Reduction—clear as above;
(v) Rinsing in tap water;
(vi) Treating for 5–10 minutes at 70° C. in a solution containing 0.2% detergent;
(vii) Rinsing in tap water and drying.

EXAMPLE 3

Guar/Salt/Alginate Thickener

Polyester knitted fabric was printed with two print pastes constituted as follows:

| | Test Recipe (%) | Conventional Recipe (%) |
| --- | --- | --- |
| Palanil Brilliant Blue P-BGF liquid (non-ionic disperse dye) | 4.0 | 4.8 |
| Monosodium orthophosphate | 0.1 | 0.1 |
| Silcolapse 5006 (anti-foam agent based on silicon fluid emulsion) | 0.1 | 0.1 |
| Prisulon SPE-K (thickner | | |

-continued

|  | Test Recipe (%) | Conventional Recipe (%) |
|---|---|---|
| based on guar/starch derivative) | — | 3.75 |
| Thickener | 3.5 | — |
| Water | 92.3 | 91.25 |
|  | 100 | 100 |

The dy was then fixed and washed.

The prints showed equal color intensity, although 20% less dye was used in the test recipe.

The thickener was prepared by dry mixing the following ingredients:

|  | Amt. (Wt. %) |
|---|---|
| Sodium alginate (Manucol ® DH, Kelco/AIL International Ltd.) | 34 |
| Starch ether (Solvitose C5, Tunnel Avebe Starches Ltd.) | 38 |
| Hydrocolloid/salt blend of Example 1 | 28 |

The calcium content of the thickener was 5%, based on the amount of sodium alginate.

EXAMPLE 4

Guar/Salt/Alginate Thickener

Polyester knitted fabric was printed with two print pastes constituted as follows:

|  | Test Recipe (%) | Conventional Recipe (%) |
|---|---|---|
| Dispersol Rubine C-B liquid (anionic disperse dye) | 4.0 | 4.8 |
| Monosodium orthophosphate | 0.1 | 0.1 |
| Matexil PA-L (sodium m-nitrobenzene sulphonate) | 1.0 | 1.0 |
| Manutex RS (high viscosity sodium alginate with 0.6 percent Ca++ on alginate) | — | 2.25 |
| Thickener | 3.6 | — |
| Calgon (sodium-hexa-m-phosphate | — | 0.55 |
| Water | 91.3 | 91.3 |
|  | 100 | 100 |

The dye was then fixed and washed.

The prints showed equal color intensity although 20 percent less dye was used in the test recipe.

The thickener was the same as in Example 3.

EXAMPLE 5

Guar/Calcium Citrate/Alginate Thickener

Polyester knitted fabric was printed with two print pastes constituted as follows:

|  | Test Recipe (%) | Conventional Recipe (%) |
|---|---|---|
| Dispersol Rubine C-B liquid (anionic disperse dye) | 4.0 | 4.8 |
| Monosodium orthophosphate | 0.1 | 0.1 |
| Matexil PA-L (sodium m-nitrobenzene sulphonate) | 1.0 | 1.0 |
| Manucol ® DH (medium viscosity sodium alginate with 0.2% CA++ on alginate) | — | 3.2 |
| Thickener | 3.6 | — |
| Calgon (sodium hexa-m-phosphate) | — | 0.8 |
| Water | 91.3 | 90.1 |
|  | 100 | 100 |

The dye was then fixed and washed.

The colour intensity on the prints corresponded to a dye saving of 20% when the test recipe was used. The amount of alginate (Manucol DH) in the test recipe was 1.2% vs. 3.2% in the conventional recipe.

The thickener was the same as in Example 3.

EXAMPLE 6

CMC/Salt/Alginate Thickener

Following the procedure of Example 1 but using carboxymethyl cellulose instead of guar, a blend was prepared which was then used to prepare a 34/38/28 thickener as in Example 3.

Polyester knitted fabric was printed with two print pastes constituted as follows:

|  | Test Recipe (%) | Conventional Recipe (%) |
|---|---|---|
| Palanil Brilliant Blue BGF liquid (anionic disperse dye) | 4.0 | 4.6 |
| Monosodium orthophosphate | 0.1 | 0.1 |
| Silcolapse 5006 (antifoam agent based on silicon fluid emulsion | 0.1 | 0.1 |
| Prisulon SPE-K (thickener based on guar/starch derivatives) | 10 | 3.75 |
| Thickener | 4.7 | — |
| Water | 91.1 | 91.45 |
|  | 100 | 100 |

The dyewas then fixed and washed.

The print showed equal colour intensity although 13% less dye was used in the test recipe.

EXAMPLE 7

Guar/Salt/Alginate Thickener

Polyester knitted fabric was printed with two print pastes constituted as follows:

|  | Test Recipe (%) | Conventional Recipe (%) |
|---|---|---|
| Palanil Brilliant blue BGF liquid | 3.6 | 4.8 |
| Luprintan HDF, fixation accelerator (BASF) | 1.5 | 1.5 |
| Monosodium orthophosphate | 0.2 | 0.2 |
| Silcolapse 5006 | 0.1 | 0.1 |
| Prisulon SPE-K | — | 3.75 |
| Thickener | 2.7 | — |
| Water | 91.9 | 89.65 |
|  | 100 | 100 |

The dye was then fixed and washed. The colour intensity on the print correspondend to a dye saving of 25%.

The thickener was prepared by dry mixing the following ingredients:

|  | Amt. (Wt. %) |
|---|---|
| Sodium alginate (Manucol ® DH) Citric acid anhyd. | 8 |
| Hydrocolloid/salt blend of Example 1 | 41 |

EXAMPLE 8

Guar/Salt/Alginate Thickener

Knitted polyester was printed with two print pastes constituted as follows:

|  | Test Recipe (%) | Conventional Recipe (%) |
|---|---|---|
| Palanil Dark Blue 3 RT liquid (anionic disperse dye) | 4.2 | 6.0 |
| Luprintan HDF (non-ionic fixation accelerator based on fatty acid derivative) | 1.5 | 1.5 |
| Monosodium or orthophosphate | 0.2 | 0.2 |
| Silcolapse 5006 | 0.1 | 0.1 |
| Prisulon SPE-K | — | 3.75 |
| Thickener | 3.6 | — |
| Water | 90.4 | 88.45 |
|  | 100 | 100 |

The dye was then fixed and washed.

The prints showed equal color intensity although 30% less dye was used in the test recipe.

The thickener was the same as in Example 3.

EXAMPLE 9

Solubility vs. Water Hardness

The following table demonstrates the improved solubility of alginates in hard water when mixed with the hydrocolloid/salt blends of this invention as compared to the solubility of alginates when merely mixed with the same salts. In the table the first two samples are dry blends of sodium alginate and calcium citrate (sufficient to give 45% calcium conversion). The viscosity readings are actual. The third sample was of the same composition as the thickener in Example 3. In the fourth sample, the thickener was of similar composition to that of Example 3 except that the hydrocolloid/salt blend was 74% xanthan gum and 26% calcium citrate.4H$_2$O. The viscosity readings shown for samples 3 and 4 were obtained from a plot of viscosity vs. water hardness.

TABLE 9-1

| | Viscosity vs. Water Hardness | | |
|---|---|---|---|
| | | RVT Brookfield Visc., cP, 20° C. 18 hr | |
| Sample | Algin Conc$^N$ (%) | 50 ppm CaCO$_3$ Hardness | 350 ppm CaCO$_3$ Hardness |
| 1 | 1.71 | 42,800 | 24,400 |
| 2 | 1.81 | 42,600 | 27,400 |
| 3 | 1.75 | 38,500 | 70,300 |
| 4 | 2.0 | 87,000 | 76,000 |

EXAMPLE 10

Pet Food Formulation

A gelled pet food was prepared using as the thickener sodium alginate and a hydrocolloid/salt blend of this invention comprising guar and calcium sulfate. The composition of the pet food was:

|  | Wt. % |
|---|---|
| Sodium alginate (Manugel ® GMB) | 5.0 |
| Tetrasodium pyrophosphate | 0.5 |
| Water (DI) | 249 |
| Guar/Ca So$_4$ Blend | 12.5 |
| Chopped meat | 250 |

Gel strength was measured for one hour and the following data obtained.

| Setting time (min.) | Gel Strength (gms)* |
|---|---|
| 5 | 111 |
| 10 | 214 |
| 20 | 398 |
| 30 | 538 |
| 40 | 697 |
| 60 | 932 |

*Stevens - LFRA Texture Analyser, 1" (2.54 cm) plunger, 4 mm penetration.

EXAMPLE 11

Bakery Custard Formulations

A custard was prepared of the following compositions:

|  | Wt. (%) |
|---|---|
| Lacticol ® F 336 (dairy grade sodium alginate blend) | 2.5 |
| Guar/Ca SO$_4$ blend | 1.0 |
| Paselli BC, pre-gelatinized potato starch | 20 |
| Full cream milk powder | 30 |
| Caster sugar | 50 |
| Deionized water | 250 |

The gel strength of the custard was 117 gm at 30 mins and 332 gm at 18 hr, measured on a Stevens LFRA Texture Analyser.

EXAMPLE 12

Viscosity vs. Water Hardness

Hydrocolloid/salt blends in the ratios 14.3:85.7 and 85.7:14.3 were prepared following the procedure of Example 1. These blends were mixed with sodium alginate to form thickeners, which were dissolved in water of varying hardness. The following solubility data were obtained:

TABLE 12-1

| | | | Viscosity vs. Water Hardness | |
|---|---|---|---|---|
| Thickener Conc (%) | Algin conc (%) | Hydro./Salt Blend | Viscosity* (cP) (1 hr/18 hr) | |
| | | | 50 ppm CaCO$_3$ | 350 ppm CaCO$_3$ |
| 5.78 | 2.0 | 14.3:85.7 | 37,400/75,700 | 30,300/67,600 |

TABLE 12-1-continued

| Thickener Conc (%) | Algin conc (%) | Viscosity vs. Water Hardness Hydro./Salt Blend | Viscosity* (cP) (1 hr/18 hr) 50 ppm CaCO$_3$ | 350 ppm CaCO$_3$ |
|---|---|---|---|---|
| 5.78 | 2.0 | 85.7:14.3 | 63,400/66,800 | 115,800/105,400 |

*RVT Brookfield viscometer, 20° C.

We claim:

1. A mixture of (A) a blend of (1) hydrocolloid selected from the group consisting of guar, oxidized guar, carboxymethyl guar, hydroxyalkyl guar, polyvinyl alcohol, carboxymethyl cellulose, xanthan gum, cold water soluble locust bean gum, cold water soluble starch, hydroxyethylated starch, and hydroxypropylated starch and (2) calcium citrate salt wherein the ratio of salt to hydrocolloid ranges from 10:1 to 0.05:1 and (B) the amount of calcium citrate is that necessary to replace 16–60% of the alginate cation with calcium.

2. A mixture of claim 1 wherein the ratio (A):(B) is such that the amount of calcium citrate is that necessary to replace 25–50% of the alginate cation with calcium.

3. A mixture of claim 1 wherein the hydrocolloid is guar, oxidized guar, carboxymethyl guar, hydroxyalkyl guar, carboxymethylcellulose, or xanthan gum, and the alginate is sodium alginate.

4. A mixture of claim 3 wherein the guar is hydroxyethyl guar.

5. A print paste composition comprising (1) a pigment, anionic dye, or non-ionic dye, and (2) 10 to 90% by weight of a mixture of claim 1.

6. A print paste composition of claim 5 wherein the soluble alginate is sodium alginate, and the amount of calcium citrate is that necessary to replace 25 to 50% of the alginate cation with calcium, further comprising a thickening agent which is one or a combination of guar, carboxymethyl guar, locust bean gum, carboxymethyl cellulose, sodium-carboxymethyl cellulose, or starch ether.

7. A process for printing substrates which comprises applying to said substrates a print paste composition of claim 5.

* * * * *